United States Patent Office 3,063,766
Patented Nov. 13, 1962

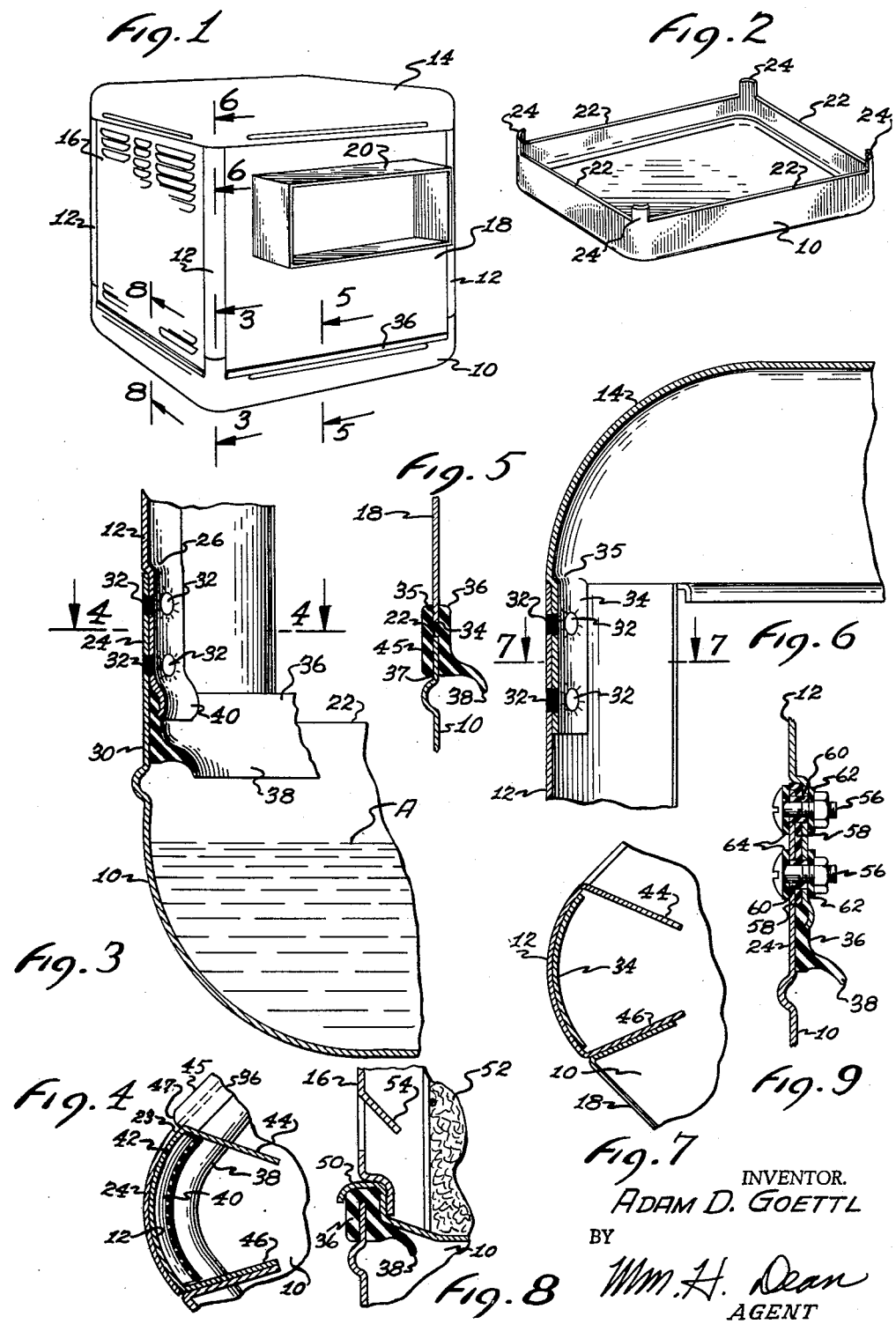

3,063,766
COOLER PAN AND FRAME CONSTRUCTION
Adam D. Goettl, Phoenix, Ariz., assignor to McGraw-Edison Company, Elgin, Ill., a corporation of Delaware
Filed Aug. 3, 1959, Ser. No. 831,317
9 Claims. (Cl. 312—31.03)

This invention relates to a cooler pan and frame construction for evaporative coolers and more particularly to a cooler pan and frame construction wherein the sump pan of an evaporative cooler when drawn from a flat piece of sheet metal is formed with upstanding corners which extend well above the area occupied by the water when the sump pan is filled to a predetermined level whereby the upstanding corner portions are normally out of the water filled area and provide substantially corrosion free frame corner supports or attachment elements.

In the manufacture of evaporative coolers a sump pan is constructed to hold water in the bottom of the cooler and generally the frame elements of the cooler are secured to the sump pan. Heretofore corner frame elements of evaporative coolers have been secured internally of the sump pan and oftentimes the lower ends of the frame members extend into the area of the pan normally filled with water. This situation creates some difficult problems in the manufacture of evaporative coolers particularly the maintenance of corrosion resistant attachments of the frame elements with the pan. For example, the pan is usually processed to render it corrosion resistant and then the vertical corner frame members of the evaporative cooler are secured to the pan either by spot welding or if these elements are bolted to the pan some means of sealing must be provided to prevent the pan from leaking around the bolts.

In such prior art construction it has not been possible to provide the pan with some corrosion resistant coatings since they preclude the possibility of spot welding the vertical frame members to the corners of the pan. While the corner frame members may be bolted to the pan this manner of attachment is unsatisfactory and as hereinbefore pointed out the process of spot welding the frame members to the pan is precluded when certain desirable coatings are used to render the pan corrosion resistant. For example, any of the rubberized coatings which might be used to line the inner surface of the pan would prevent spot welding since these are non-conducting materials and since it is well established that clean metals of compatible welding character must be placed contiguous to each other before successful spot welding may be accomplished.

Furthermore, prior art structures having metal to metal contact between the pan and sides of a cooler permit minerals to be carried by moisture from the pan to be deposited on the sides of the cooler.

Accordingly, it is an object of the invention to provide a cooler pan frame construction which is capable of being manufactured with facility due to upstanding tabs found on the pan which extend above the sump area therein.

Another object of the invention is to provide a cooler pan and frame construction wherein the pan when deep drawn is provided with upstanding portions at the corners thereof; said upstanding portions being formed of the material normally known as flashing and which has heretofore been put away and discarded.

Another object of the invention is to provide a cooler pan and frame construction wherein the pan may be coated or processed to render it corrosion resistant as desired and whereby upstanding tabs on the pan may be untreated so that they are readily compatible with a spot welding process.

Another object of the invention is to provide a cooler pan and frame construction wherein the cooler pan is provided with upstanding tabs located substantially above the sump area of the pan so that the corner frame members may readily be bolted thereto without creating any leakage problems in the pan.

Another object of the invention is to provide a cooler pan and frame construction having a cooler sump pan provided with upstanding tabs to which the frame members may be bolted thereby rendering it feasible to ship complete evaporative coolers in disassembled forms so that they may readily be bolted together after shipment.

Another object of the invention is to provide a cooler pan and frame construction wherein the cooler sump pan is provided with upstanding tabs at corners thereof; said upstanding tabs being offset so that the corner frame members of an evaporative cooler may be attached thereto and lie flush with the outer surfaces of the pan.

A further object of the invention is to provide a cooler pan and frame construction wherein means is provided to prevent electrolytic or galvanic action between the cooler pan and frame members.

It is a further object of the invention to provide means for isolating a cooler pan from the sides thereof to prevent moisture from the inside of the pan from carrying minerals upwardly onto the sides of the coolers.

Further objects and advantages of the invention may be apparent from the following specification, appended claims and accompanying drawings in which:

FIG. 1 is a perspective view of an evaporative cooler containing the cooler pan and construction of the present invention.

FIG. 2 is a perspective view of the sump pan only, of the cooler pan and frame construction, of the invention.

FIG. 3 is an enlarged fragmentary sectional view taken from the line 3—3 of FIG. 1.

FIG. 4 is a fragmentary sectional view taken from the line 4—4 of FIG. 3.

FIG. 5 is an enlarged fragmentary sectional view taken from the line 5—5 of FIG. 1.

FIG. 6 is an enlarged fragmentary sectional view taken from the line 6—6 of FIG. 1.

FIG. 7 is an enlarged fragmentary sectional view taken from the line 7—7 of FIG. 6.

FIG. 8 is a fragmentary sectional view taken from the line 8—8 of FIG. 1; and

FIG. 9 is a fragmentary sectional view similar to FIG. 3 showing a modification of structure to prevent electrolytic or galvanic action between the cooler pan and frame members.

As shown in FIG. 1 an evaporative cooler according to the present invention is provided with a sump pan 10, vertical corner frame members 12 and a top pan 14. This particular cooler shown in FIG. 1 of the drawings is a side delivery cooler, however, the present invention relates to evaporative coolers in general including the bottom delivery type coolers which have an air delivery duct extending centrally through the sump pump 10.

The particular cooler shown is provided with conventional louver plates 16 on three sides and a solid plate 18 on the remaining side. A side delivery duct 20 is supported by the plate 18 which is fixed between two of the vertical frame members 12.

The pan 10 as shown in FIG. 2 of the drawings is a deep drawn section formed from a piece of flat sheet metal. This pan when formed in conventional deep draw dies is initially provided with the conventional flashing about the upper edge thereof. This flashing is normally trimmed away to provide straight upper edges 22 along the sides of the pan.

The flashing which has heretofore been trimmed away from the corners of the pan, is according to the present invention, formed upwardly into tabs 24 which are arcuate in cross section as shown in FIGS. 4 and 7 of the drawings.

It will be seen that the upstanding tab 24 shown in FIG. 3 of the drawings is secured to the corner frame member 12 by spot welds 32 which are well above the water level A in the pan 10. This permits all of the pan 10 below the upper edges 22 to be processed as desired to render the pan corrosion resistant while the tabs 24 may remain in their bare metal state so they are fully compatible with spot welding processes.

The corner frame members 12 are slightly offset in line with the upper edges of the tabs 24 as shown best in FIG. 3 of the drawings. These frame members 12 are offset inwardly at 26 so that the tabs 24 may be flush with the outer side 30 of the pan 10.

It will be further be understood that holes may be drilled through the tabs 24 and the corner frame members 12 so that these parts may be bolted together as desired. Thus, the frame may be secured together before or after shipment as desired.

The side 18 of the cooler is provided with a lower edge 34 which rests in an upwardly directed channel 35 of a flexible grommet strip 36. This grommet strip 36 is provided with an inwardly extending lip 38 overhanging the sump formed by the pan 10. This lip 38 is preferably made of resilient material such as rubber or the like and is an integral part of the grommet strip 36. The lip 38 prevents moisture from passing upwardly from the pan 10 to the side 18 of the cooler and thus mineral deposits are prevented from accumulating on the side 18. The grommet strip 36 is provided with a downwardly directed channel 37 spaced from the upwardly directed channel 35 in which the lower edge 34 of the side 18 is positioned. This downwardly directed channel receives an upwardly directed edge 22 of the pan 10 and thereby isolates the side wall 18 from the pan 10 to prevent the upward movement of mineral and deposit on the side 18.

The grommet strip 36 extends around the inside of the pan 10 at the corners and is contiguous with the inner sides of the tabs 24. The portion of the grommet strip 36 outwardly of the sides of the cooler terminates at the edges 23 of the tabs 24 while the lip portion 38 continues around the inner sides of the tabs 24 and this lip portion 38 at the corners is held in position by an arcuate clamping portion 40 of the corner members 12 as shown best in FIG. 3 of the drawings.

As shown in FIG. 4 of the drawings the corner members 12 are each provided with an arcuate section 42 which is integral with inwardly directed flanges 44 and 46. It will be seen that the clamping portion 40 shown in FIG. 3 of the drawings only extends throughout the arcuate portion 42 of the corner frame members and that the outer portion 45 of the grommet strip 36 outside the walls of the cooler and the cooler pan terminate at ends which abut the vertical edges 23 of the tabs 24.

As shown in FIG. 8 of the drawings the grommet strip 36 is similar to its configuration as shown in FIG. 5 of the drawings except that the upper channel 35 thereof is eliminated to provide a rest for a louver plate and pad frame 16. Thus, the sides of the cooler, in which there are louver plates, are equipped with the grommet structure shown in FIG. 8 of the drawings. The lip 38 extends below the louver plate and pad frame structure and serves the same function hereinbefore described in connection with the structure shown in FIGS. 3 and 5 of the drawings. The louver plate and pad frame structure is provided with an inverted channel 50 which rests on the top side of the grommet strip 36 as shown in FIG. 8 of the drawings and this channel structure 50 thus accurately locates the plane of the louver plate 16 with respect to the side of the cooler pan 10. Carried by the louver plate and pad frame 16 is a conventional evaporate cooler pad 52 which is spaced backwardly from louvers 54 in the plate 16.

As shown in FIGS. 6 and 7 of the drawings the top pan 14 is provided with inwardly offset tabs 34 secured to the vertical frame members 12. It will be understood that these tabs 34 are offset at 39 in a similar fashion to the offset of the corner frame members 12 at their juncture with the tabs 24. It will be understood that either the tabs or the frame members may be offset in order to accomplish a flush relationship of the outside of the frame members relative to the outside surfaces of the pans 10 and 14.

It will be obvious to those skilled in the art that the tabs 24 of the pan 10 may be offset inwardly to receive the frame members 12 at the outside thereof in order to maintain a flush relationship of the outer side portions of the frame members 12 and the pan 10.

Under such conditions however the support of the grommet strip 36 may be attached by other means than the clip 40 which is integral with the lower ends of the corner frame members 12.

It will also be understood that the tabs 34 integral with the top pan 14 may be straight while the corner frame members 12 may be offset inwardly to occupy a position inwardly of the tabs 34.

As shown in FIG. 9 of the drawings a means is provided to prevent electrolytic or galvanic action between the pan 10 and the corner frame members 12. Various alloys which may be used in the pan 10 and corner frame members 12 may, in the presence of operating conditions, be subjected to electrolytic or galvanic action. Accordingly, the pan and frame members are electrically insulated from each other.

The pan tabs 24 are secured to the corner frame members 12 by bolts 56. Disposed between each tab 24 and a respective corner frame member is an electrical insulation plate 58. An electrical insulation sleeve 60 surrounds each bolt 56 and extends through the tab 24, corner frame member 12 and plate 58. Electrical insulation washers 62 and 64 are on each bolt 56 and engage the tab 24 and frame member 12, respectively. Thus the pan is electrically insulated from the frame members 12 and the bolts 56 are insulated from both the pan and frame members 12.

From the foregoing it will be appreciated that the cooler pan and frame construction of the present invention greatly facilitates the construction of an evaporative cooler which may be fabricated to avoid the effects of corrosion or electrolytic action at the connection locations of the vertical frame members with the sump pan and also provides for isolation of the sides of the cooler from the pan to prevent the upward travel of moisture which normally conducts and deposits minerals on the sides of the cooler.

It will be further understood that the cooler pan and frame construction of the present invention greatly facilitates the manufacture of cooler pan and frame structures since it permits the pan over its entire sump area to be processed for corrosion resistance while the corner frame members of the evaporative cooler may readily be secured to upstanding tabs at the corner of the frame which tabs are above the sump area of the cooler pan. Accordingly, the vertical frame members may either be spot welded to the upstanding tabs of the pan or then may be bolted thereto as desired without corrosion at the joints or any leakage from the sump of the cooler.

It will be obvious to those skilled in the art that various modifications of the present invention may be resorted to in a manner limited only by a just interpretation of the following claims.

I claim:

1. In an evaporative cooler pan and frame construction the combination of: a one piece sump pan at the bottom of an evaporative cooler; upstanding tabs integral with said pan and disposed above the water sump area thereof; and vertical frame members secured to said upstanding tabs at points above the top of said pan.

2. In an evaporative cooler pan and frame construction the combination of: a one piece sump pan at the bottom of an evaporative cooler; upstanding tabs integral with said pan and disposed above the water sump area thereof; vertical frame members secured to said upstanding tabs; a grommet strip disposed at the upper edge of said sump pan; and evaporative cooler louver plate structure supported on said grommet strip above the upper edge of said sump pan; said grommet strip having an inwardly extending lip overhanging the sump in said pan and extending around the inner sides of the corners and in contiguous relationship thereto.

3. In an evaporative cooler pan and frame construction the combination of: a one piece sump pan at the bottom of an evaporative cooler; upstanding tabs integral with said pan and disposed above the water sump area thereof; vertical frame members secured to said upstanding tabs; sides for an evaporative cooler disposed above said sump pan; and grommet strip interposed between said sides and the upper edge portions of said sump pan; said grommet strip having a lip extending inwardly and overlying the sump of said pan, said grommet extending around the inner sides of said sump pan in contiguous relationship therewith and located above the normal water level in said pan.

4. In a device as set forth in claim 1, said frame members being offset at the upper edge portions of said tabs whereby said frame members are flush with the outer surface of said pan.

5. In a device as set forth in claim 1, said frame members being offset at the upper edge portions of said tabs whereby said frame members are flush with the outer surface of said pan, said tabs being arcuate in cross section to conform with the arcuateness of the respective corners of said pan, said frame members being conformingly arcuate with said tabs, said tabs being disposed at said respective corners.

6. In a device as set forth in claim 1, said pan in the sump area thereof being treated with corrosion treated material and said tabs being untreated to be compatible with a spot welding process for connection of said vertical frame members thereto.

7. In a device as set forth in claim 1, a grommet strip disposed at the upper edge of said sump pan; and evaporative cooler louver plate structures supported on said grommet strip above the upper edge of said sump pan.

8. In a device as set forth in claim 1, and sides for an evaporative cooler disposed above said sump pan; and a grommet strip interposed between said sides and the upper edge portions of said sump pan.

9. In a device as set forth in claim 1, said tabs being disposed at corners of said pan, said pan being of generally rectangular configuration.

References Cited in the file of this patent

UNITED STATES PATENTS

| | | |
|---|---|---|
| 1,715,037 | Kerr | May 28, 1929 |
| 2,348,663 | Thomas | May 9, 1944 |
| 2,368,403 | Barnes | Jan. 30, 1945 |
| 2,433,104 | Eberhart | Dec. 23, 1947 |
| 2,588,612 | Brookins | Mar. 11, 1952 |
| 2,608,396 | Shapiro | Aug. 26, 1952 |
| 2,761,407 | Bowden | Sept. 4, 1956 |
| 2,805,016 | Brooking | Sept. 3, 1957 |
| 2,831,745 | Parmet | Apr. 22, 1958 |

FOREIGN PATENTS

| | | |
|---|---|---|
| 115,138 | Australia | May 28, 1942 |
| 1,046,968 | France | Dec. 10, 1953 |
| 757,924 | Great Britain | Sept. 26, 1956 |